(12) United States Patent
Garretson et al.

(10) Patent No.: US 6,578,935 B1
(45) Date of Patent: Jun. 17, 2003

(54) SLIDER TRAY STORAGE APPARATUS

(75) Inventors: Joseph K. Garretson, Simi Valley, CA (US); Lewis C. Iby, Woodland Hills, CA (US); Roger J. Alves, Simi Valley, CA (US)

(73) Assignee: Scosche Industries, Inc., Oxnard, CA (US)

( * ) Notice: Subject to any disclaimer, the term of this patent is extended or adjusted under 35 U.S.C. 154(b) by 0 days.

(21) Appl. No.: 10/103,019

(22) Filed: Mar. 22, 2002

(51) Int. Cl.⁷ .............................................. A47B 81/06
(52) U.S. Cl. .................... 312/9.16; 312/9.18; 312/9.48; 312/9.63; 312/9.9; 361/725
(58) Field of Search ............................... 312/9.16, 9.18, 312/9.42, 9.48, 9.63, 9.9, 9.11, 323, 223.2; 361/725, 726, 727; 206/308, 309, 308.3, 310, 493

(56) References Cited

U.S. PATENT DOCUMENTS

| | | | | |
|---|---|---|---|---|
| 4,258,961 A | * | 3/1981 | Ackeret | 312/111 |
| 4,265,369 A | * | 5/1981 | Aboussouan | 221/87 |
| 4,664,454 A | * | 5/1987 | Schatteman et al. | 312/9.19 |
| 4,722,034 A | * | 1/1988 | Ackeret | 362/86 |
| 4,728,157 A | * | 3/1988 | David, Jr. | 312/9.16 |
| 4,770,474 A | * | 9/1988 | Ackeret | 312/9.63 |
| 4,771,887 A | | 9/1988 | Nehl | |
| 4,811,995 A | * | 3/1989 | Ackeret | 312/9.63 |
| 4,875,578 A | | 10/1989 | Nehl | |
| 5,141,103 A | | 8/1992 | Stephan | |
| 5,215,212 A | * | 6/1993 | Stephan | 206/387.12 |
| 5,377,175 A | | 12/1994 | Nehl | |
| 5,706,943 A | * | 1/1998 | Yu | 206/387.12 |
| 5,819,930 A | * | 10/1998 | Yu | 206/308.1 |
| 5,931,295 A | | 8/1999 | Kaupp | |
| 6,000,541 A | * | 12/1999 | Yu | 206/308.1 |
| 6,396,686 B1 | * | 5/2002 | Liu et al. | 361/685 |

* cited by examiner

Primary Examiner—Leslie A. Braun
Assistant Examiner—Amy J. Sterling
(74) Attorney, Agent, or Firm—William W. Haefliger

(57) ABSTRACT

CD player apparatus comprising a case having a front opening and side walls, and a slider in the case to carry a CD or DVD, and forwardly movable toward and partly through the front opening; a release at one side wall to be actuated to release the slider for forward movement relative to the front opening; an arm at the outer side of the side wall and supported to pivot toward and away from the release; and an actuator carried by the arm to be manually moved to pivot the arm toward the release to activate the release, whereby the slider can then move forward relative to the front opening.

47 Claims, 10 Drawing Sheets

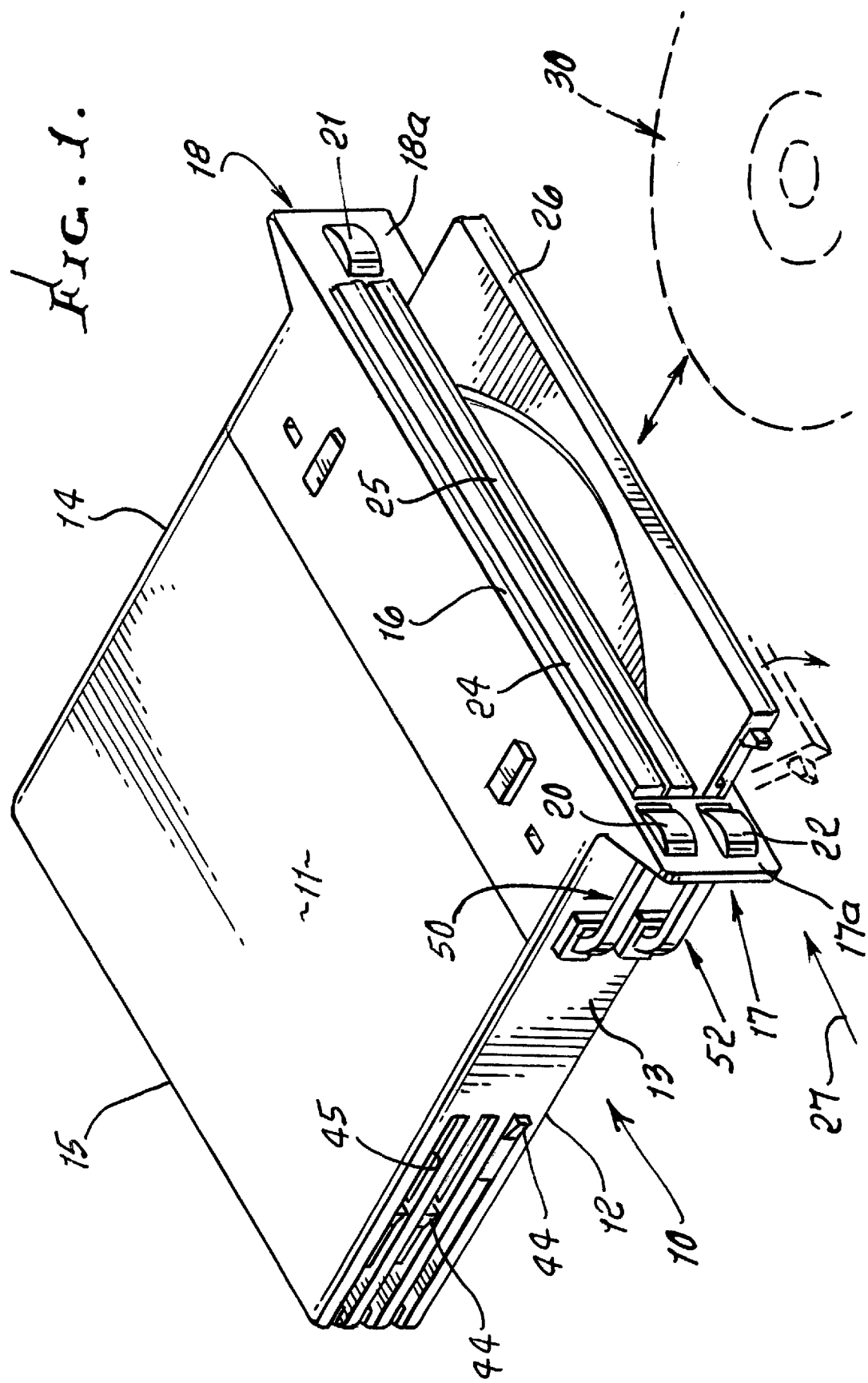

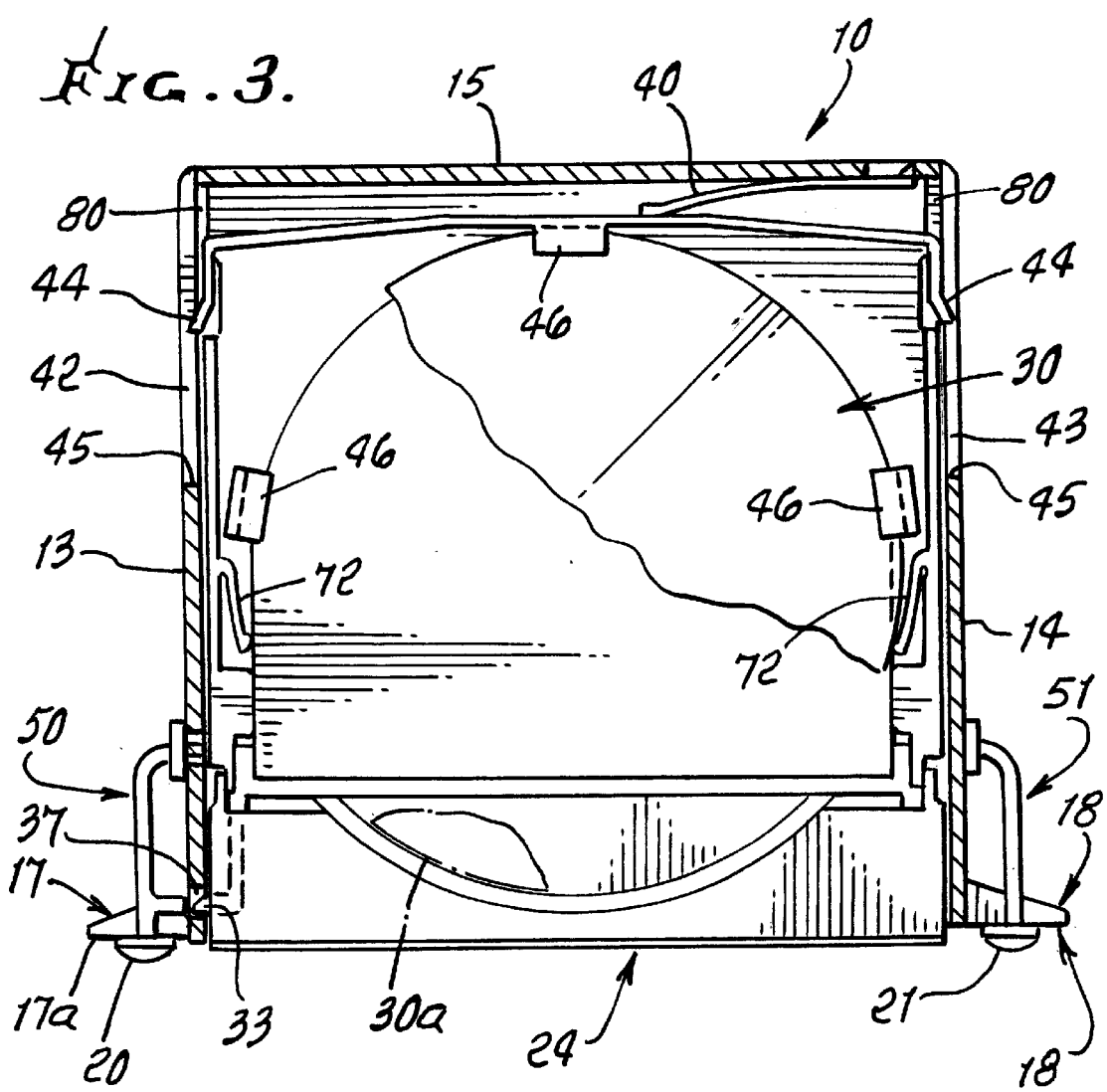
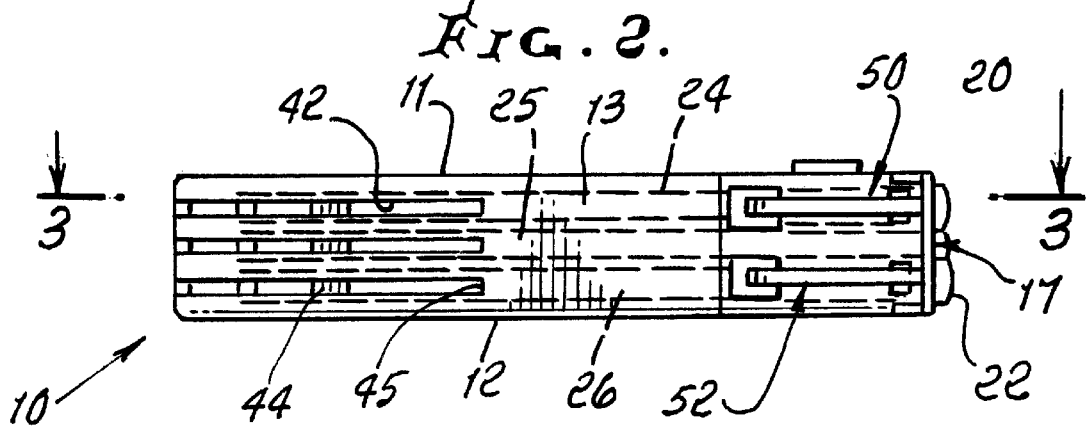

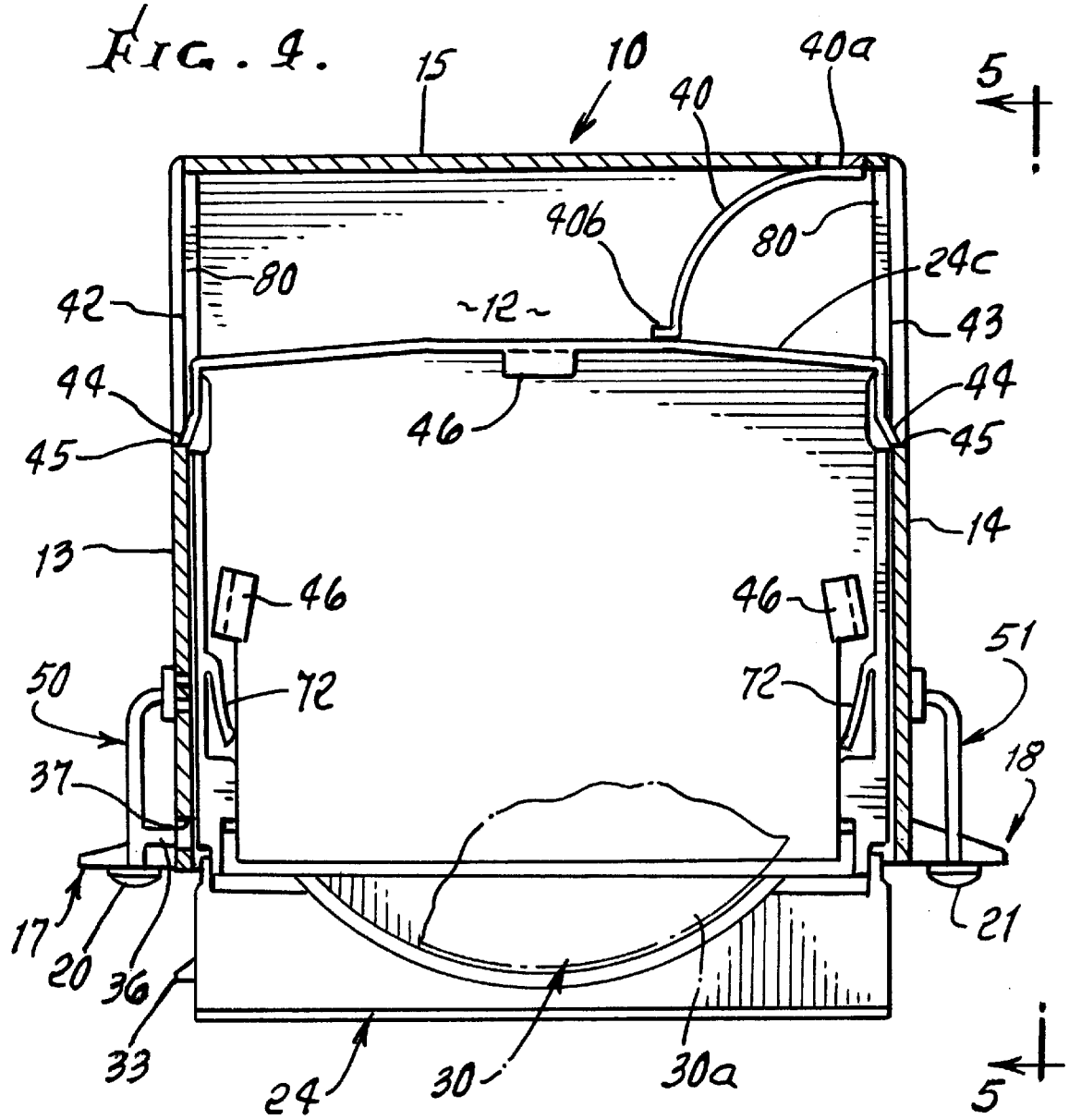
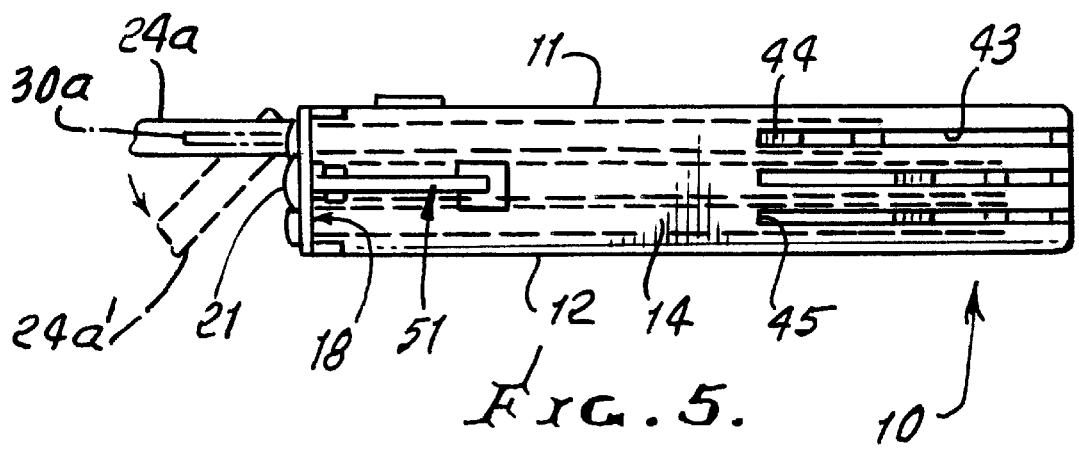

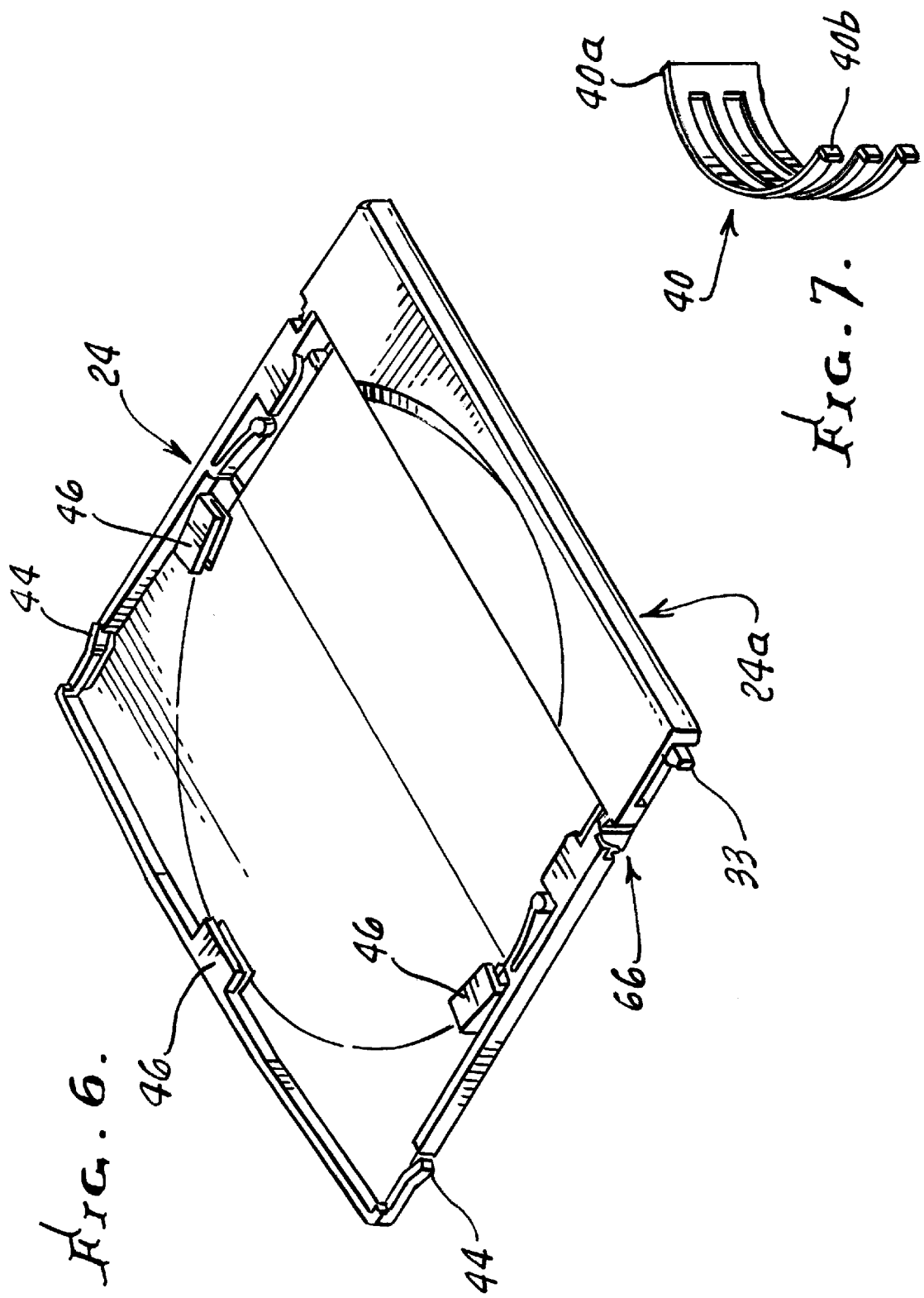

SLIDER TRAY STORAGE APPARATUS

BACKGROUND OF THE INVENTION

This invention relates generally to apparatus having a slider carrying an element to be stored in a case, and retrieved, in an improved and simple way; and more particularly concerns compact apparatus wherein the part to be stored and retrieved is an information disc, such as a digital video disc, or a compact disc.

There is need for improved apparatus of the type referred to, since known apparatus is complex, bulky and expensive. Also, typical known apparatus lacks the unusual advantages in structure, function and results provided by the present invention.

SUMMARY OF THE INVENTION

It is a major object of the invention to provide improved apparatus that overcomes the above problems, and that is compact and simple in functioning and operation. Basically, the improved apparatus comprises:

a) a case having a front opening and side walls, and a slider in the case to carry a CD or DVD, and forwardly movable toward and partly through said front opening, b) a release at one side wall to be actuated to release the slider for forward movement relative to said front opening, c) an arm at the outer side of said side wall and supported to pivot toward and away from the release, d) and an actuator carried by the arm to be manually moved to pivot the arm toward the release to activate the release, whereby the slider can then move forward relative to the front opening.

The invention has particular application to storage and retrieval of information discs such as CD's and DVD's.

It is another object of the invention to provide the release to be carried by the slider, the case side wall having a through opening, the release projecting toward that through opening to lock the slider to the case prior to actuation of the release by the actuator.

A further object is to provide a pusher on the arm, movable toward said opening, at the outer side of the side wall.

Yet another object is to provide a second arm at the inner side of said side wall carrying the release to resiliently pivot toward and away from said opening.

Another object is to provide the slider to have a pivotally supported front portion carrying the release, to pivot downwardly. That portion is typically blocked against pivoting prior to pivoting of the release away from said opening. Further, the release typically projects into said opening prior to pivoting of the release away from said opening.

An added object is to provide for multiple exterior arms and buttons, to enable selective release of different sliders carried in the case. Those arms may be protectively concealed behind a flange or flanges associated with the case.

A yet further object is to provide a slider having a forward portion that drop-tilts downwardly in forward position of the slider, away from an information disc carried by the slider. The release may be carried by the tilting portion, so as not to interfere with information disc placement onto the slider, as well as disc retrieval from the slider.

An additional object is to provide two bracket plates one attached at its forward end to one of the flanges and the other plate attached at its forward end to the other of the flanges, whereby the two bracket plates then extend rearwardly, and sidewardly of the case in spaced and protective relation to said arm. As will be seen, two mounting plates may be provided to be respectively attached to the bracket plates, each mounting plate carrying or having structure attachable to a vehicle dashboard frame, whereby the case front opening is then presented at the dashboard toward the vehicle interior. In addition, an electronics unit chassis such as a CD player chassis or a vehicle radio chassis may be located above the case, to extend between the two mounting plates which may also be attached to that chassis. A highly compact, stabilized and multi-use assembly is provided.

These and other objects and advantages of the invention, as well as the details of an illustrative embodiment, will be more fully understood from the following specification and drawings, in which:

DRAWING DESCRIPTION

FIG. 1 is a perspective view showing one preferred form of the invention;

FIG. 2 is a left side elevation view of the case seen in FIG. 1;

FIG. 3 is a top plan view taken on lines 3—3 of FIG. 2, and showing a slider in retracted position, relative to the case;

FIG. 4 is a view like FIG. 3, but showing the slider in forwardly extended position;

FIG. 5 is a right side elevation view of the case, taken on lines 5—5 of FIG. 4;

FIG. 6 is a perspective view of the slider seen in FIGS. 3 and 4;

FIG. 7 is a perspective view f an external spring arm;

DETAILED DESCRIPTION

Figure 8:
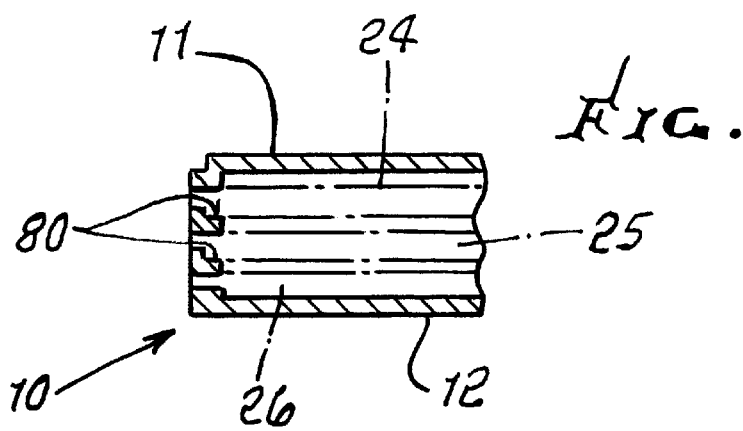
FIG. 8 is an enlarged fragmentary view of interfitting of two sliders in the case.

In the drawings, a case 10 has a top wall 11, a bottom wall 12, left and right side walls 13 and 14, a rear wall 15 and a front wall 16. Flanges 17 and 18 are carried by or associated with side walls 13 and 14, and project sidewardly. They have forward facing surfaces 17a and 18a, as shown. Actuators, such as buttons 20–22 are presented forwardly at the forward sides of surfaces or faces 17*a* and 18*a* with buttons 20 and 22 associated with flange 17, and button 21 associated with flange 18.

Selective actuation of the actuators or buttons, effects selective release and forward sliding movement of sliders, such as trays 24–26 carried in the case; i.e. if button 20 is actuated, as for example moved rightwardly in the direction of arrow 27, the top tray 24 is released to move forwardly from retracted position as seen in FIG. 3 to extended position as seen in FIG. 5; and correspondingly, if button 21 is moved to the left, tray 25 is released to move forwardly; and if button 22 is moved to the right, tray 26 is released to move forwardly.

The trays typically carry information discs 30 such as compact discs (CDs) or digital video discs (DVDs), for safe, compact storage in the case. FIG. 3 shows a disc 30 concealed and safely stored and retained completely in the case, in such a way that inadvertent discharge of the disc is blocked, the slider or tray 24 being retracted; whereas FIG. 5 shows the disc forwardmost position 30*a* in forwardly advanced and exposed position, its slider or tray 24 being in forward extended position. Manual access to upper and lower sides of the disc portion 30*a* in FIG. 4 is enhanced, by downward tilting of a forward portion 24*a* of the tray 24 as indicated by broken line position 24*a*', in FIG. 5.

Note further that the left and right positioning of the tray release buttons 20–22 facilitates operator manual selection of the tray to be released, and also enables larger sizing of multiple release mechanisms associated with those buttons, within the confines of a limited or restricted size case, i.e. restricted to the size of an instrument panel opening, in an automobile or other vehicle.

Figure 12:
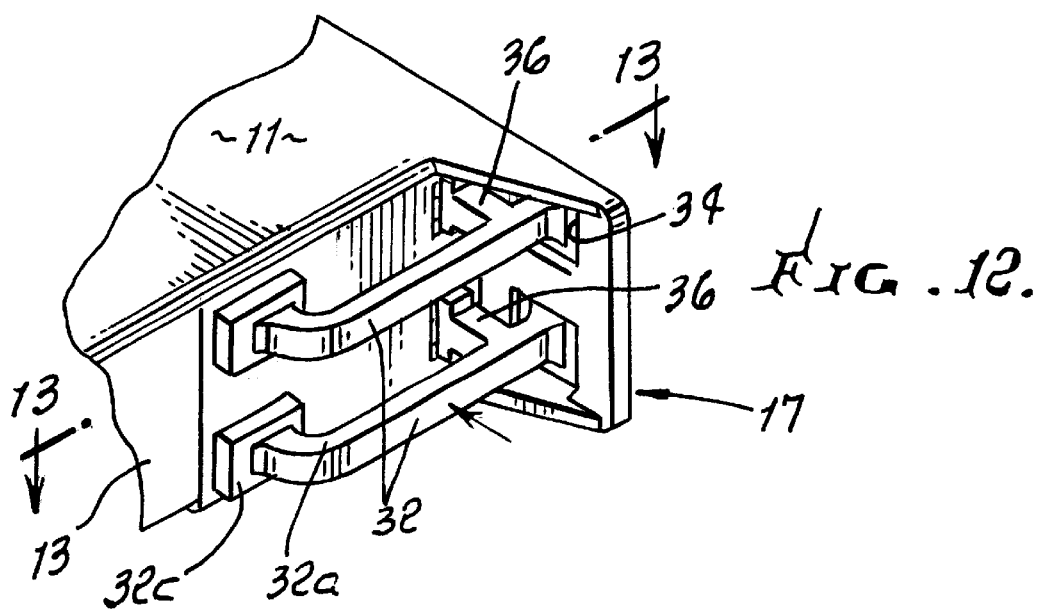
FIG. 12 is a perspective view showing inter-relationship of two external spring arms.
Figure 13:
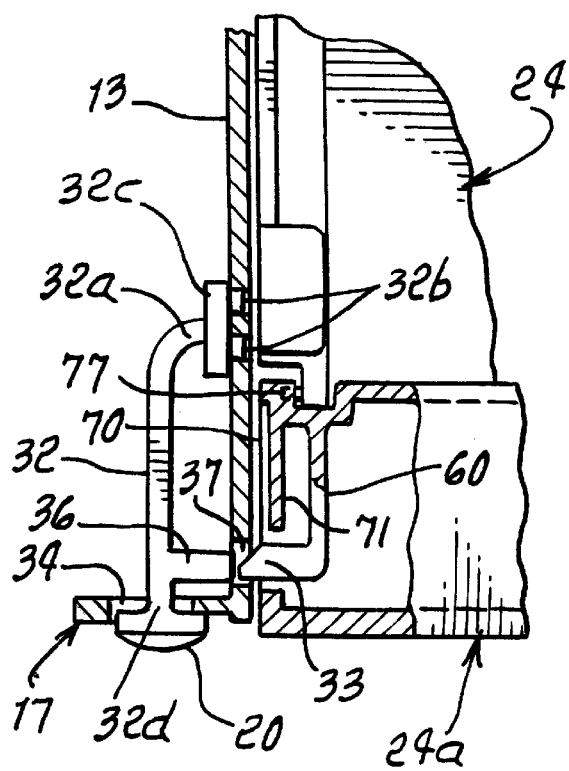
FIG. 13 is a fragmentary plan view taken on lines 13—13 of FIG. 12, and showing the position of a spring arm prior to actuation of a release.
Figure 14:
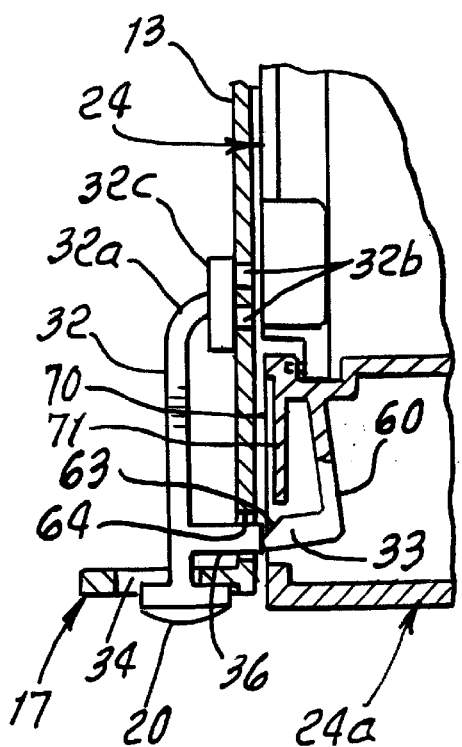
FIG. 14 is a view like FIG. 13 showing the spring arm during actuation of the release.

Referring to FIGS. 12–14, the release mechanism, for each slider or tray, includes a spring arm 32 at the outer side of the case wall 13, and supported to pivot in a direction toward and away from a release in the form of a leftwardly extending projection 33. For example, one end 32*a* of arm 32 is anchored to the case side wall 13, as by a pin 32*b* and flange 32*c*. The opposite end 32*d* of the arm 32 extends through an opening 34 in flange 17, and carries button or knob 20 at the front side of that flange. A pusher in the form of a protrusion 36 carried by the arm 32 projects rightwardly toward release 33. A window 37 in wall 13 normally receives or captivates the end of the release projection 33 (in the form of a catch) to hold the slider in retracted position. See FIGS. 3 and 13. When that slider 24 (associated with release 33) is selected, and button or knob 20 is manually moved to the right, the pusher 36 engages the end or tip of the release 33, and pushes it out of, or free of, the window 37, and its edges, whereby the slider is freed for forward movement, as urged by a flat spring 40, seen in FIGS. 3, 4 and 7. That spring has one end 40*a* carried by case rear wall, and its opposite end 40*b* bears against the rear wall 24*c* of the slider 24. These springs are carried by end 40*a*, to bear against the rear walls of the three sliders. A separate release mechanism is provided for each slider.

Slider edge guide means 42 and 43, such as grooves at the case side walls 13 and 14, guide the slider forward and rearward movement. A stop or stops at 44, engageable by a slider edge or edges 45, limits forward travel of the slider as in FIG. 4 position. Channel shaped holders 46 on the slider removably receive the curved edge of the disc 30, as shown in FIG. 3, as in stored position.

It will be noted that the release mechanisms 50–52 associated with buttons 20–22, respectively, and like arms 32, are at the outside of the case, so as not to interfere with movements of the three sliders 24–26; and that such spring arms 32 are protectively concealed or carried, rearwardly of the flanges 17 and 18, only the buttons 20–22 being exposed forwardly of those flanges. See FIGS. 3 and 4. The arms are preferably alike. Openings 34 in the flanges accommodate sideward movement of the spring arm ends 32*c*.

Figure 9:
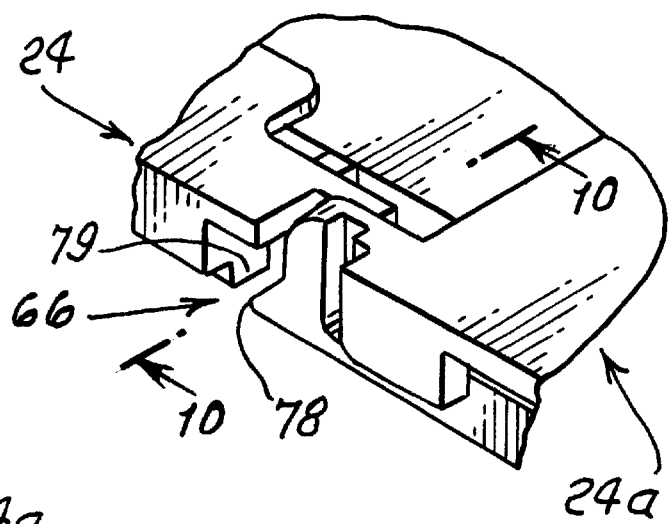
FIG. 9 is an enlarged fragmentary view showing interfit of slider portions.
Figure 10:
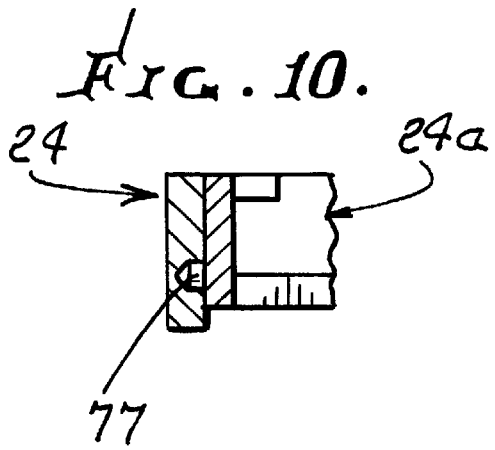
FIG. 10 is a view taken on lines 10—10 of FIG. 9.
Figure 11:
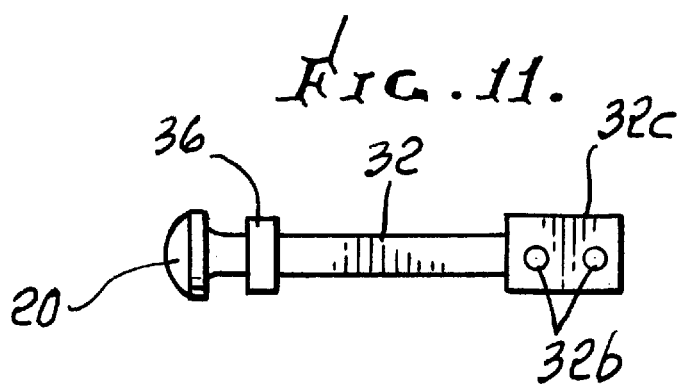
FIG. 11 is a side elevation showing details of a spring or control arm.

Referring to FIGS. 13 and 14, they show that the release 33, or projection, and its associated spring arm 60 (that urges release 33 to the left) are carried by the forward portion 24*a* of the tray 24, which drop-tilts downwardly in tray extended position, whereby the release, when pushed free of window 37, tilts downwardly with 24*a* and also does not interfere with disc removal from the slider in forwardly extended position. FIG. 5 shows the top slider forward portion 24*a* tilted downwardly (that slider extended forwardly); and the other two sliders retracted into the case when the slider forward (tilted) portion 24*a* is manually lifted back up and pushed into the case, a camming edge 63 of the release 33 engages the case or flange edge 64, to allow the release 33 to ride over that edge 64 and snap back into the window 37 to catching position as in FIG. 13. In raised position of the slider forward portion 24*a*, as seen in FIG. 5, the release 33 aligns with window 37, to facilitate such slider travel snap back positioning of 33. Interfitting structure supporting the slider forward portion 24*a* to pivot is shown at 66 in FIG. 9. The slider forward position 24*a* is blocked against tilting, in FIG. 3 position. FIG. 10 shows a pivot 77 for slider portion 24*a*. Shoulders 78 and 79 engage in FIG. 9 to limit tilting.

It will also be noted in FIGS. 13 and 14 that the slider provides a groove 70 adjacent a slider wall 71 to receive the top of the pusher as the slider and release 33 are pushed forwardly toward extended position. FIG. 3 shows disc engaging and centering webs 72 on the slider.

FIGS. 1, 3 and 5 show that the forwardmost portion 30*a* of the disc 30 overlaps the tilting forward portion 24*a* of the slider, in disc stored position. Portion 30*a* is easily grasped, manually, when portion 24*a* is tilted downwardly.

Preferably, all three release mechanisms 50–52 are alike, and they may consist of molded plastic material.

FIG. 8 shows ledges 80 in the case, for three sliders 24–26.

Figure 15:
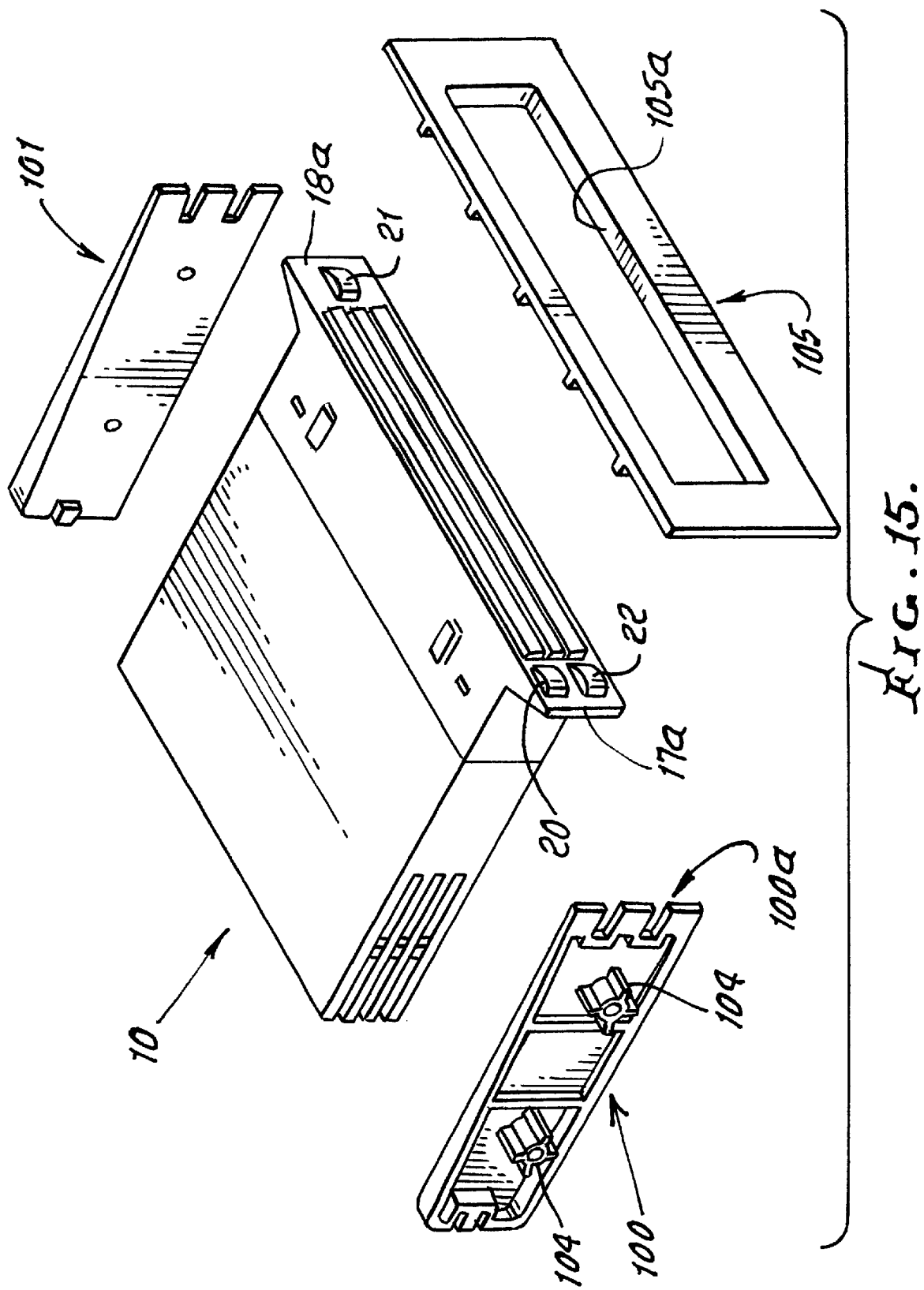
FIG. 15 is an exploded perspective view of a slider tray case together with two protective side bracket plates and a front trim plate.
Figure 16:
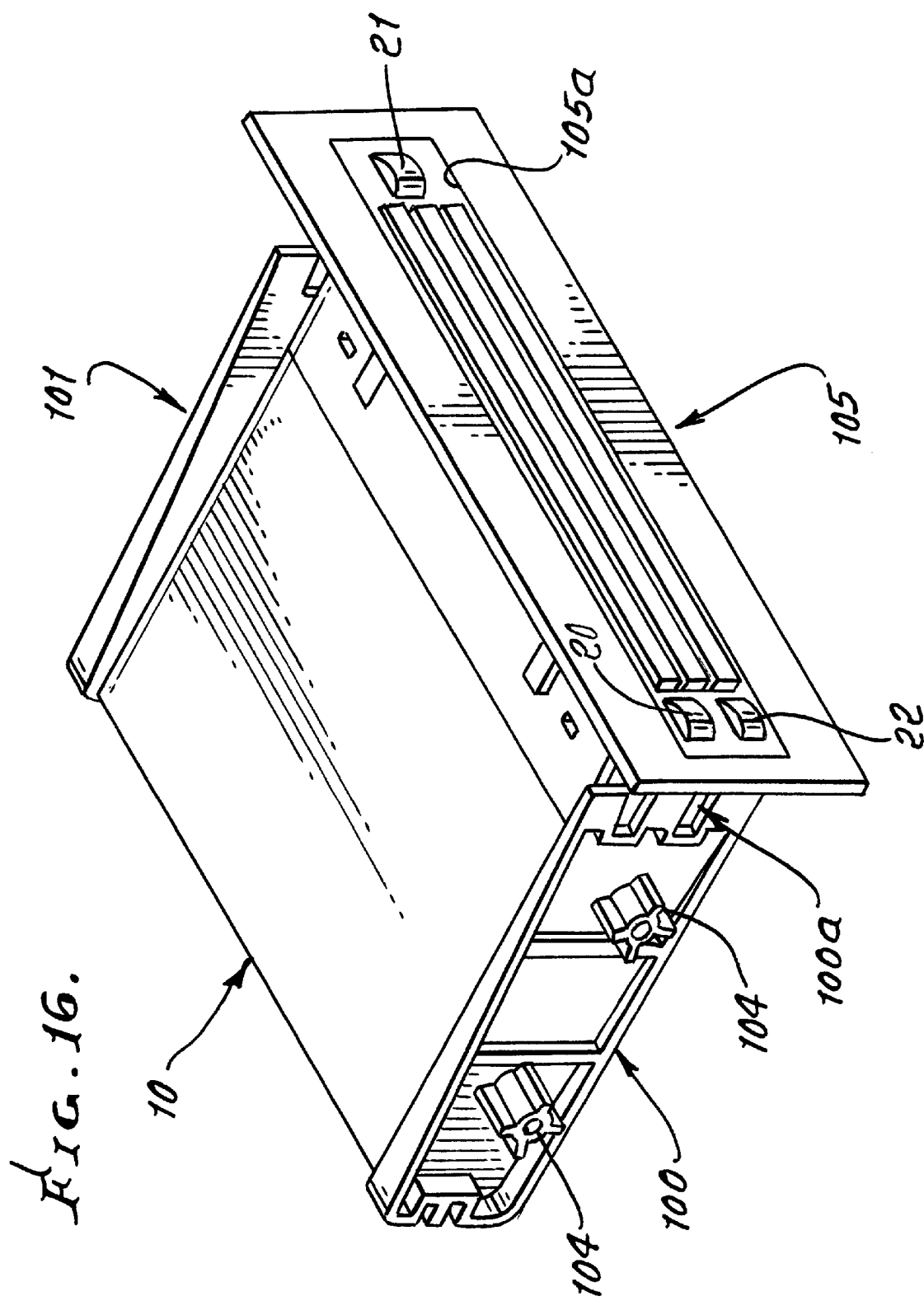
FIG. 16 is a perspective view of the case, side brackets and front trim plate in assembled condition.

FIGS. 15 and 16 show the device of FIGS. 1 and 2 including its case 10, together with two bracket plates 100 and 101 at opposite sides of the case. The dovetailed forward end 100*a* of plate 100 is attachable to the flange 17*a* at location 102 seen in FIG. 18 and the dovetailed forward end of plate 101 is attachable to flange 18*a* at a similar location. Tubular protrusions 104 on the plates are adapted to receive fasteners to attach the plate to the side walls of the case. A trim plate 105 is suitably attached to the front wall of the case, and it contains an opening 105*a* through which buttons 20–22 and the trays are accessible.

Figure 17:
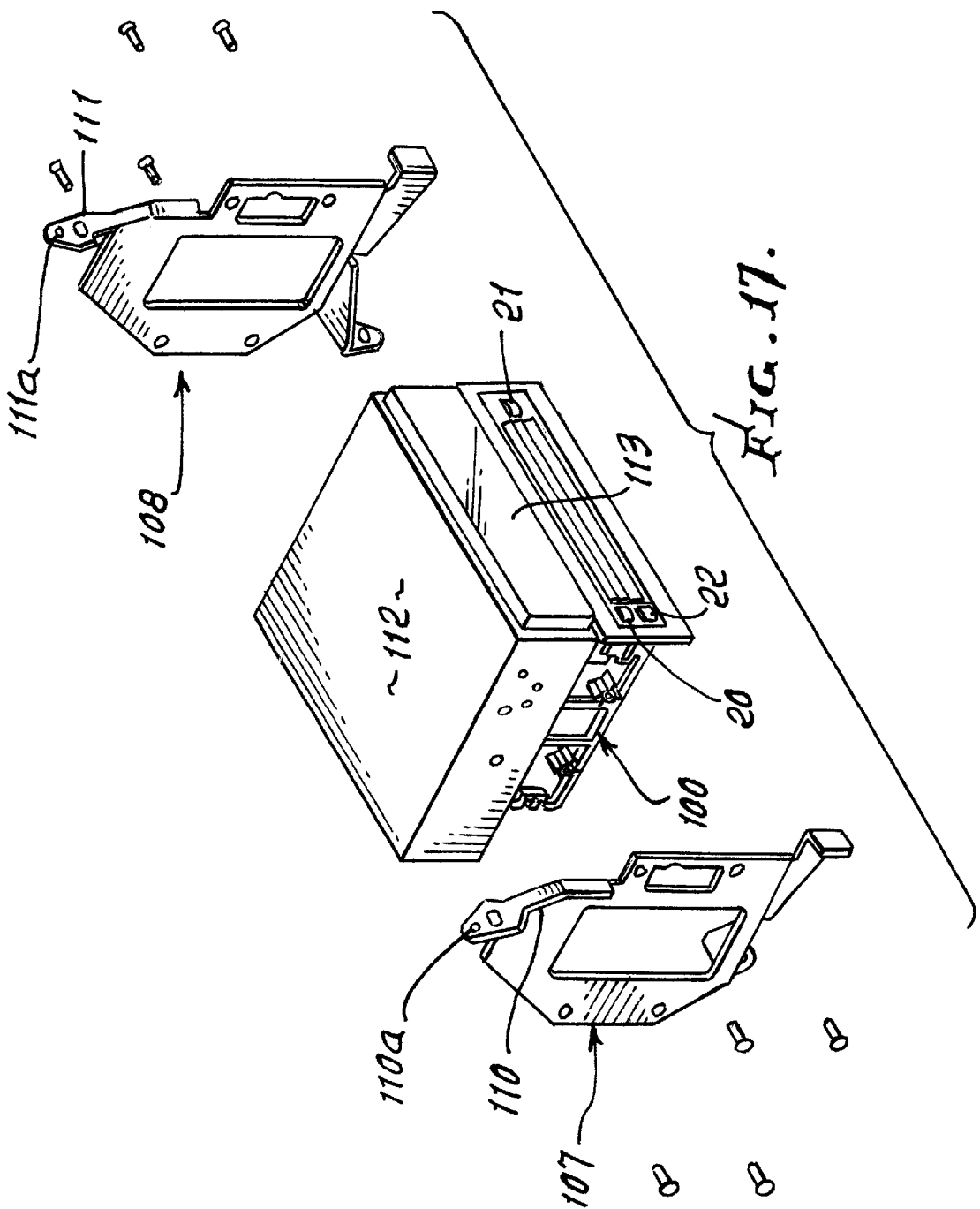
FIG. 17 is an exploded perspective view of the FIG. 16 assembly and side mounting plates, together with an electronics unit chassis.
Figure 18:
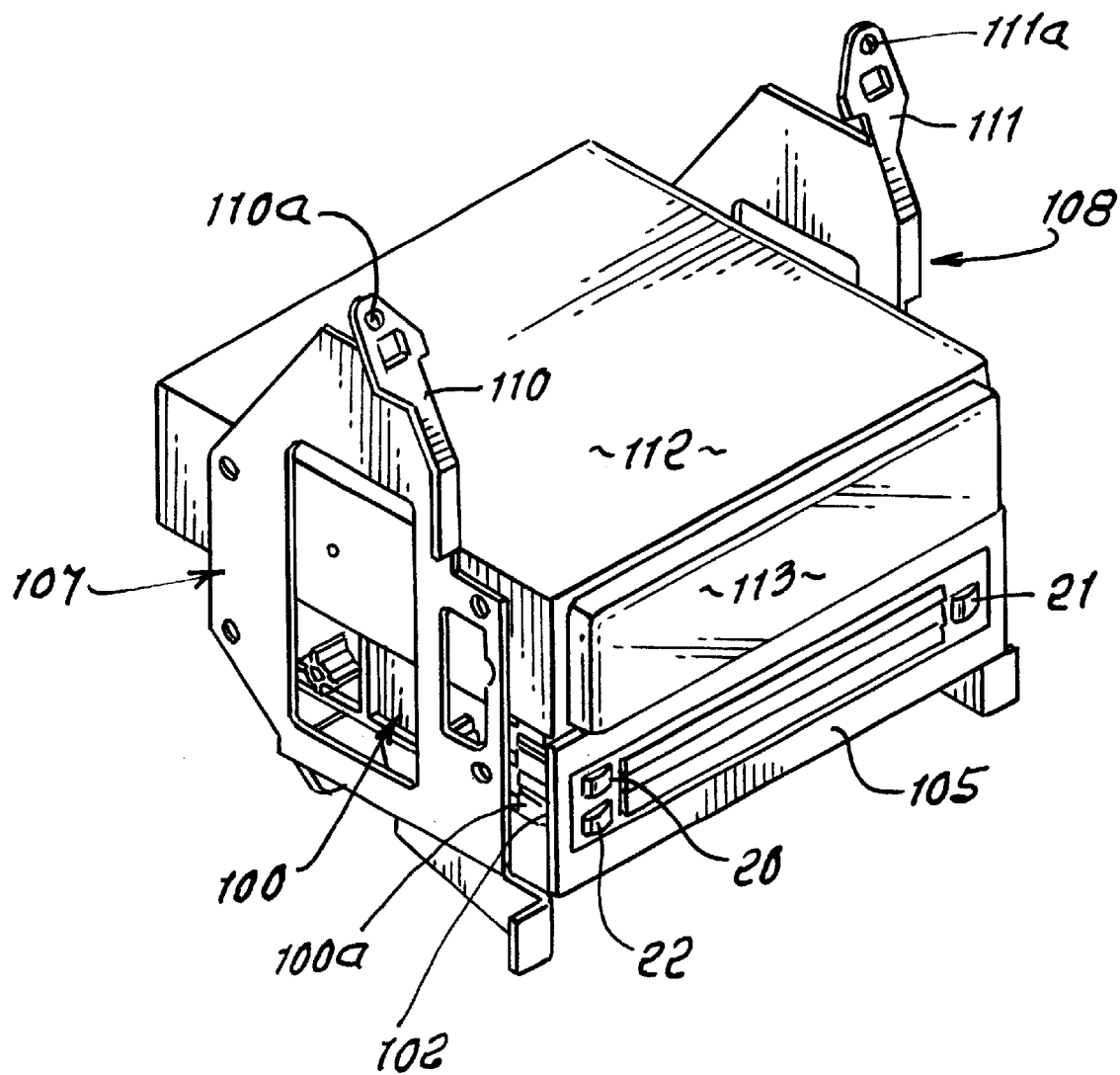
FIG. 18 is a perspective view of the elements of FIG. 17 in assembled condition.

FIGS. 17 and 18 show two mounting plates 107 and 108 respectively attachable to the bracket plates 100 and 101. Each mounting plate has structure for attaching it to a vehicle dashboard frame, whereby the case front opening is then presented at the dashboard toward the vehicle interior. See for example structure in the form of arms 110 and 111 with openings 110*a* and 111*a* for fasteners.

An electronics unit chassis 112 (as for example a CD player or radio) is carried directly above the case, between the mounting plates 107 and 108. Controls for 112 are located behind removable front cover 113.

We claim:

1. CD player apparatus comprising
   a) a case having a front opening and side walls, and a slider in the case to carry a CD or DVD, and forwardly movable toward and partly through said front opening,
   b) a release at one side wall to be actuated to release the slider for forward movement relative to said front opening,
   c) an arm operatively attached at or proximate a first end to the outer side of said side wall and supported to pivot toward and away from the release and said side wall,
   d) and an actuator carried by the arm to be manually moved to pivot the arm toward the release to activate the release, whereby the slider can then move forward relative to the front opening.

2. The apparatus of claim 1 wherein the release is carried by the slider to project toward said arm.

3. The apparatus of claim 2 wherein the case side wall has a through opening, the release projecting toward said through opening to lock the slider to the case prior to actuation of the release by the actuator.

4. The apparatus of claim 3 including a pusher on the arm movable toward said opening, at the outer side of the side wall.

5. The apparatus of claim 3 including a second arm at the inner side of said side wall carrying the release to resiliently pivot toward and away from said opening.

6. The apparatus of claim 4 including a second arm at the inner side of said side wall carrying the release to resiliently pivot toward and away from said opening.

7. The apparatus of claim 2 wherein the slider has a pivotally supported front portion carrying the release, to pivot downwardly.

8. The apparatus of claim 5 wherein the slider has a pivotally supported front portion carrying the release to pivot downwardly, said pivotally supported portion blocked against pivoting prior to pivoting of the release away from said opening.

9. The apparatus of claim 8 wherein the release projects into said opening prior to pivoting of the release away from said opening.

10. The apparatus of claim 1 including an information disc carried by the slider.

11. The apparatus of claim 10 wherein said disc is a CD.

12. The apparatus of claim 1 including at least one additional release proximate a side wall of the case and actuable to release an additional slider, for forward movement, at least one additional arm at the outer side of said side wall, and supported to pivot in a direction toward and away from the additional release, and at least one additional actuator carried to pivot said additional arm to actuate said at least one additional release, whereby said at least one additional slider can move forwardly relative to the case front opening.

13. The apparatus of claim 12 wherein there are two of said additional arms and two of said additional actuators.

14. The apparatus of claim 12 wherein two arms are at one exterior side of the case, and third arm is at the opposite exterior side of the case.

15. The apparatus of claim 1 including a flange carried by the case and projecting to conceal said arm while exposing said actuator, viewed from the front of the case.

16. The apparatus of claim 13 including two flanges carried by the case, and projecting to conceal said arms, as viewed from the front of the case.

17. The apparatus of claim 1 wherein the slider has a forward portion that drop-tilts downwardly in forward position of the slider, away from an information disc carried by the slider.

18. The apparatus of claim 17 wherein said release is carried by said slider forward portion.

19. The apparatus of claim 7 including an information disc carried by said slider, said disc overlapping said pivotally supported slider front portion, to allow grasping of the disc when said front portion tilts away from the disc.

20. The apparatus of claim 1 including a spring urging the slider in a direction toward said extended position.

21. For use with a case having a front opening and side walls, and a slider in the case, the slider movable forwardly toward and at least partly through said first opening, the combination comprising:
   a) a release proximate one side wall of the case and actuable to release the slider for forward movement,
   b) an arm operatively attached at or proximate a first end to the outer side of said one side wall relative to the case, and supported to pivot in a direction toward and away from the release and said side wall,
   c) and a button carried to pivot the arm to actuate the release whereby the slider can then move forwardly relative to said case front opening.

22. The combination of claim 21 including said slider carrying said release for displacement by the arm.

23. The combination of claim 22 including said case having a side wall, and a window in said side wall into which the release projects to hold the slider in position relative to the case, prior to displacement of the release from the window, by said arm.

24. The apparatus of claim 15 including a bracket plate attached to said flange so that the bracket plate extends sidewardly of the case in spaced and protective relation to said arm.

25. The apparatus of claim 24 including a mounting-plate attached to said bracket plate and having structure attachable to a vehicle dashboard frame, whereby the case front opening is presented toward the vehicle interior.

26. The apparatus of claim 16 including two bracket plates one attached at its forward end to one of the flanges and the other plate attached at its forward end to the other of the flanges, whereby the two bracket plates then extend rearwardly, and sidewardly of the case in spaced and protective relation to said arms.

27. The apparatus of claim 26 including two mounting plates respectively attached to said bracket plates and each having structure attachable to a vehicle dashboard frame whereby the case front opening is presented at the dashboard toward the vehicle interior.

28. The apparatus of claim 27 including an electronics unit chassis extending above the case between the mounting plates, which are also attached to said chassis.

29. CD player apparatus comprising
   a) a case having a front opening and side walls, and a slider in the case to carry a CD or DVD, and forwardly movable toward and partly through said front opening,
   b) a release at one side wall to be actuated to release the slider for forward movement relative to said front opening,
   c) a part at the outer side of said side wall and supported to move toward and away from the release,
   d) and an actuator to be manually moved to move said part toward the release to actuate the release, whereby the slider can then move forward relative to the front opening wherein the case side wall has a through opening, the release projecting toward said through opening to lock the slider to the case prior to activation of the release by the actuator, and including a spring arm at the inner side of said side wall carrying the release to resiliently pivot toward and away from said through opening, the spring arm carried by the slider.

30. The apparatus of claim 29 wherein the release is carried by the slider to project toward said arm actuation.

31. The apparatus of claim 29 including a pusher on said part movable toward said opening, at the outer side of the side wall.

32. The apparatus of claim 30 wherein the slider has a pivotally supported front portion carrying the release, to pivot downwardly.

33. The apparatus of claim 31 wherein the slider has a pivotally supported front portion carrying the release to move downwardly, said pivotally supported portion blocked against movement prior to pivoting of the release away from said opening.

34. The apparatus of claim 33 wherein the release projects into said opening prior to pivoting of the release away from said opening.

35. The apparatus of claim 29 including an information disc carried by the slider.

36. The apparatus of claim 35 wherein said disc is a CD.

37. The apparatus of claim 29 including at least one additional release proximate a side wall of the case and actuable to release an additional slider, for forward movement, at least one additional part at the outer side of said side wall, and supported to move in a direction toward and away from the additional release, and at least one additional actuator carried to move said additional part to actuate said at least one additional release, whereby said at least one additional slider can move forwardly relative to the case front opening.

38. The apparatus of claim 37 wherein the two parts are at one exterior side of the case, and there being a third part at the opposite exterior side of the case.

39. The apparatus of claim 29 including a flange carried by the case and protecting to conceal said part while exposing said actuator, viewed from the front of the case.

40. The apparatus of claim 38 including two flanges carried by the case, and projecting to conceal said parts, as viewed from the front of the case.

41. The apparatus of claim 29 wherein the slider has a forward portion that drop-tilts downwardly in forward position of the slider, away from an information disc carried by the slider.

42. The apparatus of claim 32 including an information disc carried by said slider, said disc overlapping said pivotally supported slider front portion, to allow grasping of the disc when said front portion tilts away from the disc.

43. The apparatus of claim 29 including a flange carried by the case and projecting to carry said actuator, and a bracket plate attached to said flange so that the bracket plate extends sidewardly of the case in spaced and protective relation to said part.

44. The apparatus of claim 43 including a mounting plate attached to said bracket plate and having structure attachable to a vehicle dashboard frame, whereby the case front opening is presented toward the vehicle interior.

45. The apparatus of claim 29 including two flanges carried by the case, two bracket plates one attached at its forward end to one of the flanges and the other plate attached at its forward end to the other of the flanges, whereby the two bracket plates then extend rearwardly, and sidewardly of the case.

46. The apparatus of claim 45 including two mounting plates respectively attached to said bracket plates and each having structure attachable to a vehicle dashboard frame whereby the case front opening is presented at the dashboard toward the vehicle interior.

47. The apparatus of claim 46 including an electronics unit chassis extending above the case between the mounting plates, which are also attached to said chassis.

* * * * *